(12) United States Patent
Diskey

(10) Patent No.: US 12,026,657 B2
(45) Date of Patent: Jul. 2, 2024

(54) OUTBOUND HAZMAT HANDLING SYSTEM

(71) Applicant: Walmart Apollo, LLC, Bentonville, AR (US)

(72) Inventor: Neysa Diskey, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 290 days.

(21) Appl. No.: 16/845,413

(22) Filed: Apr. 10, 2020

(65) Prior Publication Data

US 2020/0327488 A1 Oct. 15, 2020

Related U.S. Application Data

(60) Provisional application No. 62/832,540, filed on Apr. 11, 2019.

(51) Int. Cl.
*G06Q 10/0832* (2023.01)
*G06K 7/14* (2006.01)

(52) U.S. Cl.
CPC ....... *G06Q 10/0832* (2013.01); *G06K 7/1413* (2013.01)

(58) Field of Classification Search
CPC .......................... G06Q 10/0832; G06Q 10/08
See application file for complete search history.

(56) References Cited

U.S. PATENT DOCUMENTS

| | | | |
|---|---|---|---|
| 4,927,486 A | 5/1990 | Fattal | |
| 5,712,989 A * | 1/1998 | Johnson | G06Q 10/0875 705/28 |

(Continued)

FOREIGN PATENT DOCUMENTS

| | | |
|---|---|---|
| CN | 201989990 U | 9/2011 |
| CN | 102785807 A | 11/2012 |

OTHER PUBLICATIONS

Chemsafetypro; "How to Understand Packing Instructions"; Jun. 20, 2016; retrieved from https://www.chemsafetypro.com/Topics/TDG/How_to_Understand_Dangerous_Goods_Packing_Instructions.html (Year: 2016).*
VMedia; "IATA Guidelines For Air Transport of Lithium Metal and Lithium-Ion Batteries"; Jan. 2019; retrieved from https://vmedia.digital/blog/learn-help/iata-guidelines-for-air-transport-of-lithium-metal-and-lithium-ion-batteries/ (Year: 2019).*

(Continued)

*Primary Examiner* — Rupangini Singh
*Assistant Examiner* — Bryan J Kirk
(74) *Attorney, Agent, or Firm* — Foley IP Law, PLLC

(57) ABSTRACT

A system for handling hazmat products in a fulfillment center. The system includes a conveyance and packing equipment assembly that facilitates physical acquisition and consolidation of inventory items into a container, a labeling applicator that automatically applies hazmat labels, a scan tunnel, and a server. The server includes computing hardware of a processor, a memory, an input/output engine, a database, and a hazmat handling engine. The input/output engine is configured to receive a customer order and communicate between the server and the conveyance and packing equipment assembly, the labeling applicator, and the scan tunnel. The hazmat handling engine determines customer orders with exceptions requiring specialized handling. The hazmat handling engine marks determined customer orders with exceptions and forwards the remaining orders for allocation and cartonization. The labeling applicator automatically applies one or more hazmat labels to the packaged container containing hazmat items based on compliance labeling criteria.

14 Claims, 11 Drawing Sheets

(56) References Cited

U.S. PATENT DOCUMENTS

| | | | |
|---|---|---|---|
| 5,805,454 A | 9/1998 | Valerino | |
| 7,050,938 B1* | 5/2006 | Prater | G06Q 10/087 |
| | | | 702/182 |
| 7,516,889 B2 | 4/2009 | Baldassari | |
| 8,352,382 B1* | 1/2013 | Katta | G06Q 50/28 |
| | | | 705/330 |
| 11,514,386 B1* | 11/2022 | Soles | G06Q 10/083 |
| 2005/0080520 A1 | 4/2005 | Robert | |
| 2005/0209913 A1* | 9/2005 | Wied | G06Q 10/08 |
| | | | 705/330 |
| 2015/0278758 A1* | 10/2015 | Kim | G06Q 10/0835 |
| | | | 705/338 |
| 2017/0357937 A1* | 12/2017 | Edens | G06K 19/06056 |

OTHER PUBLICATIONS

Chemical Processing, "Chem Facility Improves Efficiency with Automated Labeling," chemicalprocessing.com; Apr. 2003; Retrieved from https://www.chemicalprocessing.com/home/article/11379971/chem-facility-improves-efficiency-with-automated-labeling-chemical-processing (Year: 2003).*

Granta, Robotic Box Filling and Packaging Line, available at https://www.granta-automation.co.uk/robotic-box-filling-and-packaging-line, retrieved on Aug. 7, 2020, 3 pages.

Kai Kukasch, Industrial Robot Label Applicator, available at https://www.theseus.fi/bitstream/handle/10024/132394/Kukasch_Kai.pdf?sequence=1, Metropolia University of Applied Sciences, dated May 26, 2017, retrieved on Aug. 7, 2020, 35 pages.

* cited by examiner

OUTBOUND HAZMAT HANDLING SYSTEM

RELATED APPLICATION

The present application claims the benefit of U.S. Provisional Application No. 62/832,540 filed Apr. 11, 2019, which is hereby incorporated herein in its entirety by reference.

TECHNICAL FIELD

This disclosure relates to a hazmat handling system, and more particularly to systems and related methods for packaging and labeling hazmat products for outbound shipping from a fulfillment center.

BACKGROUND

In general, fulfillment centers provide physical locations from which customer orders are completed for shipping. Fulfillment centers can include warehousing, compiling, packaging, and labeling of products and goods which are ordered by customers, such as via online retail orders. In large facilities, the logistics of efficiently and accurately operating such locations for timely meeting customer expectations is an enormously complex task.

Unlike many warehousing operations, fulfillment centers must complete many unique, individualized customer orders. One complexity of such orders is to ensure that each shipped container include appropriate shipping and safety labeling, including hazmat (hazardous material) labels, depending upon the contents and combinations thereof. In the past, attempts to provide all necessary safety labeling has been done by very simplistic systems and resulted in broad, overly-inclusive and somewhat imprecise labeling of packages. This overlabeling can involve large, unnecessary costs to fulfillment centers that process massive quantities of packages daily.

Accordingly, there is a desire for an improved system or solution permitting efficient safety labeling of products at fulfillment centers which would increase the accuracy of labeling hazmat materials, minimize overlabeling, and overcome past difficulties incurred during the allocation, packaging and shipping of goods.

SUMMARY

Embodiments described or otherwise contemplated herein substantially provide the advantages of a system that is equipped to accurately label and handle hazmat materials in a fulfillment center based upon customer orders. Safety is enhanced and wasteful packaging costs are reduced by these systems and methods.

One embodiment relates to a system for handling of hazmat products in a fulfillment center. The system includes a conveyance and packing equipment assembly that facilitates physical acquisition and consolidation of inventory items into a container, a labeling applicator that automatically applies one or more labels to the container, including a shipping label and a hazmat label when applicable, and a scan tunnel that electronically reads the barcoded labels on the container. Also included in the system is a server including computing hardware of at least one processor, a memory, an input/output engine, a database, and a hazmat handling engine. The memory is operably coupled to the at least one processor and is configured to store instructions invoked by the at least one processor. The input/output engine is configured to receive a customer order and communicate between the server and the conveyance and packing equipment assembly, the labeling applicator, and the scan tunnel. The database is communicatively coupled via the input/output engine containing downloaded hazmat file information for the inventory items. The hazmat handling engine determines customer orders with exceptions requiring specialized handling, including: customer orders that contain a hazmat item where an assigned carrier cannot handle the hazmat item; customer orders that contain a fully regulated item; customer orders that contain ORM-D/Limited Qty (other regulated materials for domestic transport only) items and a never ship packaging instruction (PI) code; and customer orders that contain lithium items and a never ship packaging instruction code. The hazmat handling engine marks determined customer orders with exceptions and forwards the remaining orders for allocation and cartonization wherein the forwarded customer orders include any associated shipping codes, PI codes, and hazmat labeling information. The server further includes an allocation and cartonization engine that receives forwarded unmarked customer orders from the hazmat handling engine, determines packaging of containers, and instructs physical acquisition and consolidation of inventory items into at least one packaged container via the conveyance and packing equipment assembly. The labeling applicator automatically applies one or more hazmat labels to the packaged container containing hazmat items based on compliance labeling criteria.

One embodiment relates to a method for handling of hazmat products in a fulfillment center. The method includes receiving customer orders of inventory items via an input/output engine of a local server, wherein the server provides instructions for a conveyance and packing equipment assembly, a labeling applicator, and a scan tunnel, wherein the server includes: at least one processor; a memory operably coupled to the at least one processor and configured to store instructions invoked by the at least one processor; the input/output engine; a database communicatively coupled via the input/output engine; and a hazmat handling engine. The method further includes determining via the hazmat handling engine whether customer orders require specialized handling exceptions based on whether they contain: a hazmat item where an assigned carrier cannot handle the hazmat item; a fully regulated item; ORM-D/Limited Qty items and a never ship PI code; or lithium items and a never ship packaging instruction code. The method further includes marking the customer orders that require specialized handing exceptions and advancing unmarked customer orders for allocation and cartonization. The method includes carrying out allocation and cartonization by determining packaging of containers and controlling physical acquisition and consolidation of inventory items from the unmarked customer orders into at least one packaged container via the conveyance and packing equipment assembly. The method includes applying one or more hazmat labels to the packaged container containing hazmat items based on compliance labeling criteria and applying a shipping label using the labeling applicator. Also, the method includes scanning the shipping label and the one or more hazmat labels with the scan tunnel and comparing scanned information to expected labels for identification of possible labeling errors and providing the packaged container for shipping as labeled.

One embodiment relates to a system for handling of hazmat products in a fulfillment center. The system includes means for receiving customer orders of inventory items. The system includes means for determining via a hazmat handling engine whether customer orders require specialized handling exceptions based on whether they contain: a hazmat item where an assigned carrier cannot handle the hazmat item; a fully regulated item; ORM-D/Limited Qty items and a never ship PI code; or lithium items and a never ship packaging instruction code. The system includes means for marking the customer orders that require specialized handling exceptions and means for advancing unmarked customer orders for allocation and cartonization. The system includes means for carrying out allocation and cartonization by determining packaging of containers and controlling physical acquisition and consolidation of inventory items from the unmarked customer orders into at least one packaged container via the conveyance and packing equipment assembly. The system includes means for applying one or more hazmat labels to the packaged container containing hazmat items based on compliance labeling criteria and applying a shipping label using the labeling applicator. The system includes means for scanning the shipping label and the one or more hazmat labels with the scan tunnel and comparing scanned information to expected labels for identification of possible labeling errors and means for providing the packaged container for shipping as labeled.

The above summary is not intended to describe each illustrated embodiment or every implementation of the subject matter hereof. The figures and the detailed description that follow more particularly exemplify various embodiments.

BRIEF DESCRIPTION OF THE FIGURES

Subject matter hereof may be more completely understood in consideration of the following detailed description of various embodiments in connection with the accompanying figures, in which.

Figure 1:
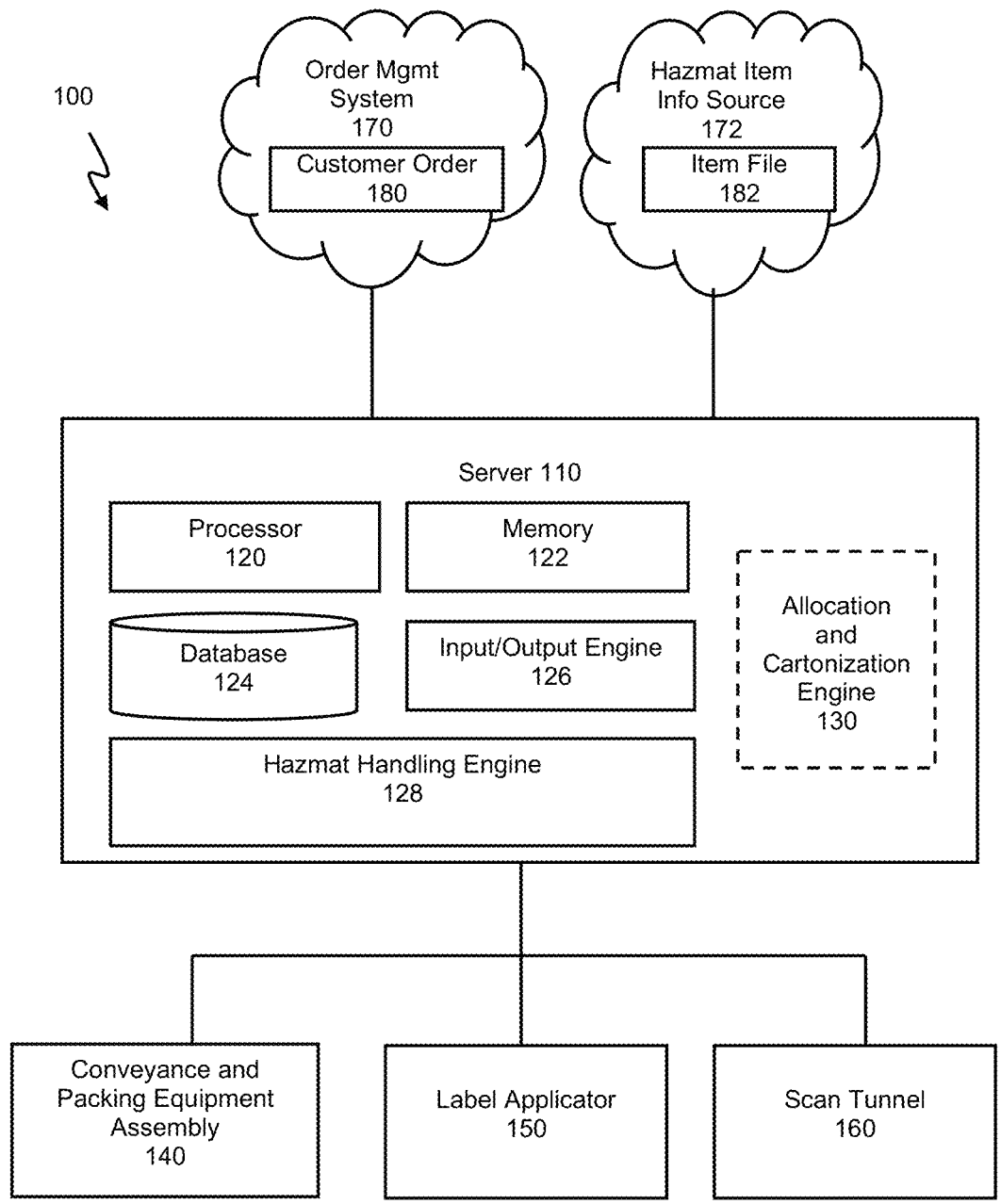
FIG. 1 is a diagram of an outbound hazmat handling system, according to an embodiment.

While various embodiments are amenable to various modifications and alternative forms, specifics thereof have been shown by way of example in the drawings and will be described in detail. It should be understood, however, that the intention is not to limit the claimed subject matter to particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments generally relate to a system and related methods for safe and compliant handling and labeling of hazmat products in a fulfillment center. The system directs determinations of what can be shipped over what conveyance as well as exception handling.

Figure 2A:
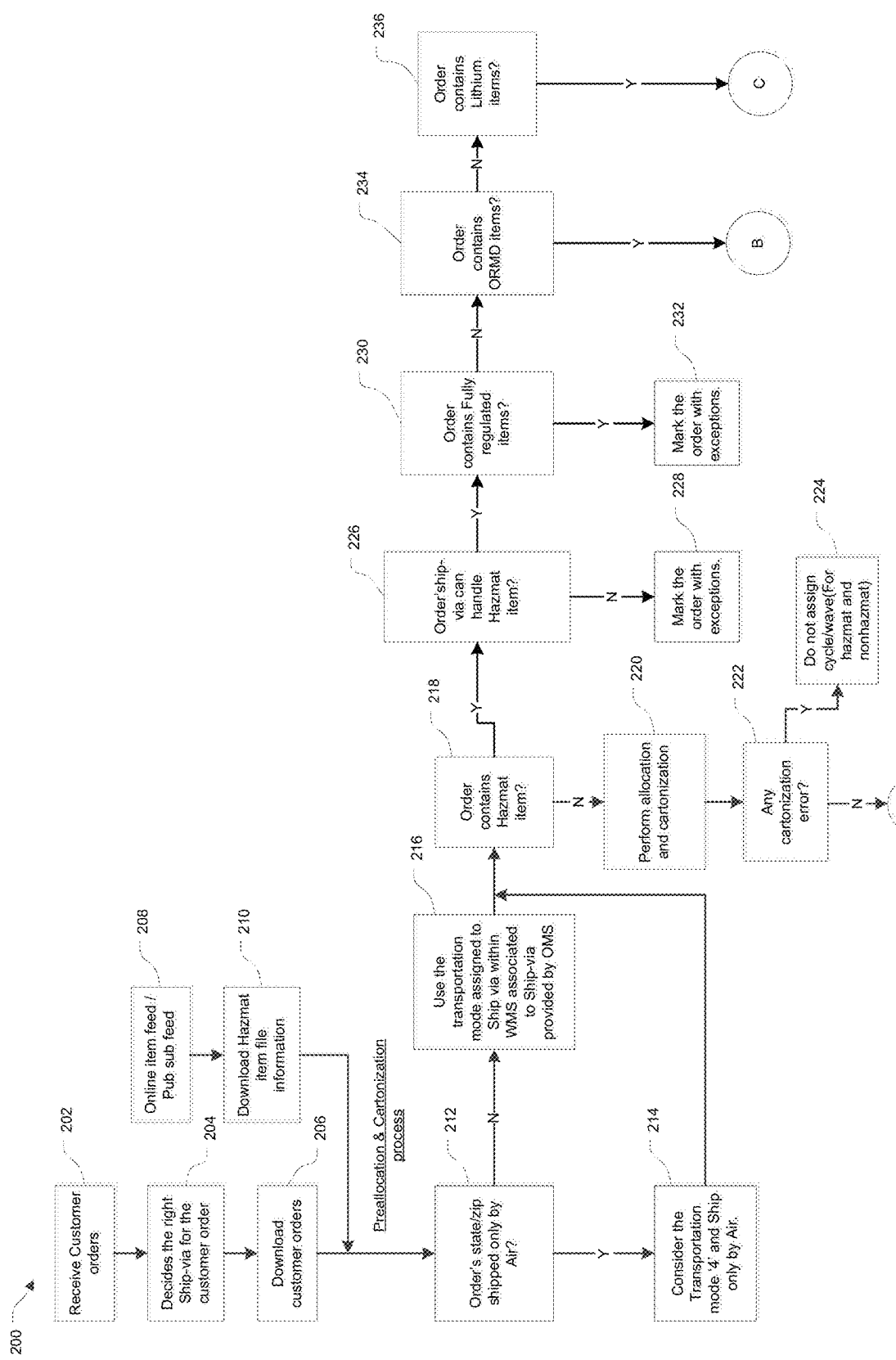
FIGS. 2A-E show a process flow chart of operation of an outbound hazmat handling system, according to an embodiment.
Figure 2B:
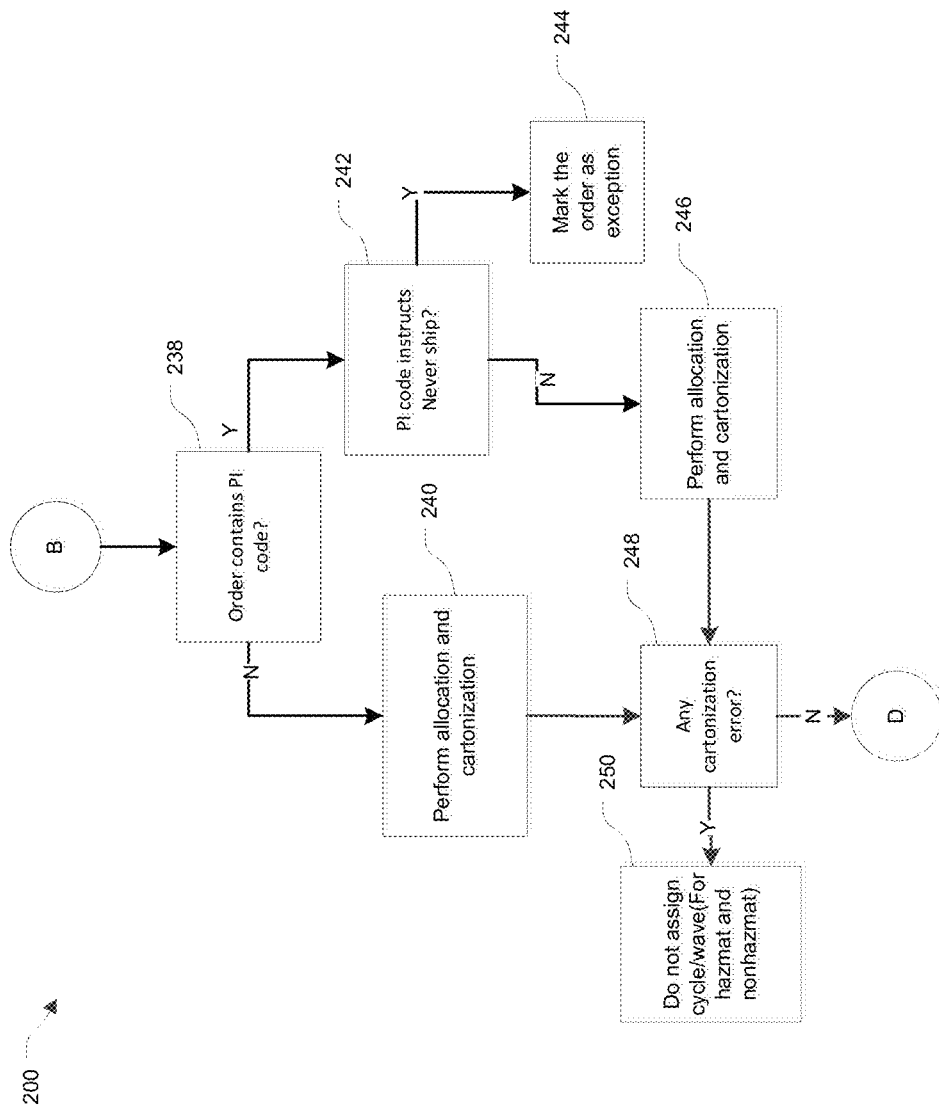
Figure 2C:
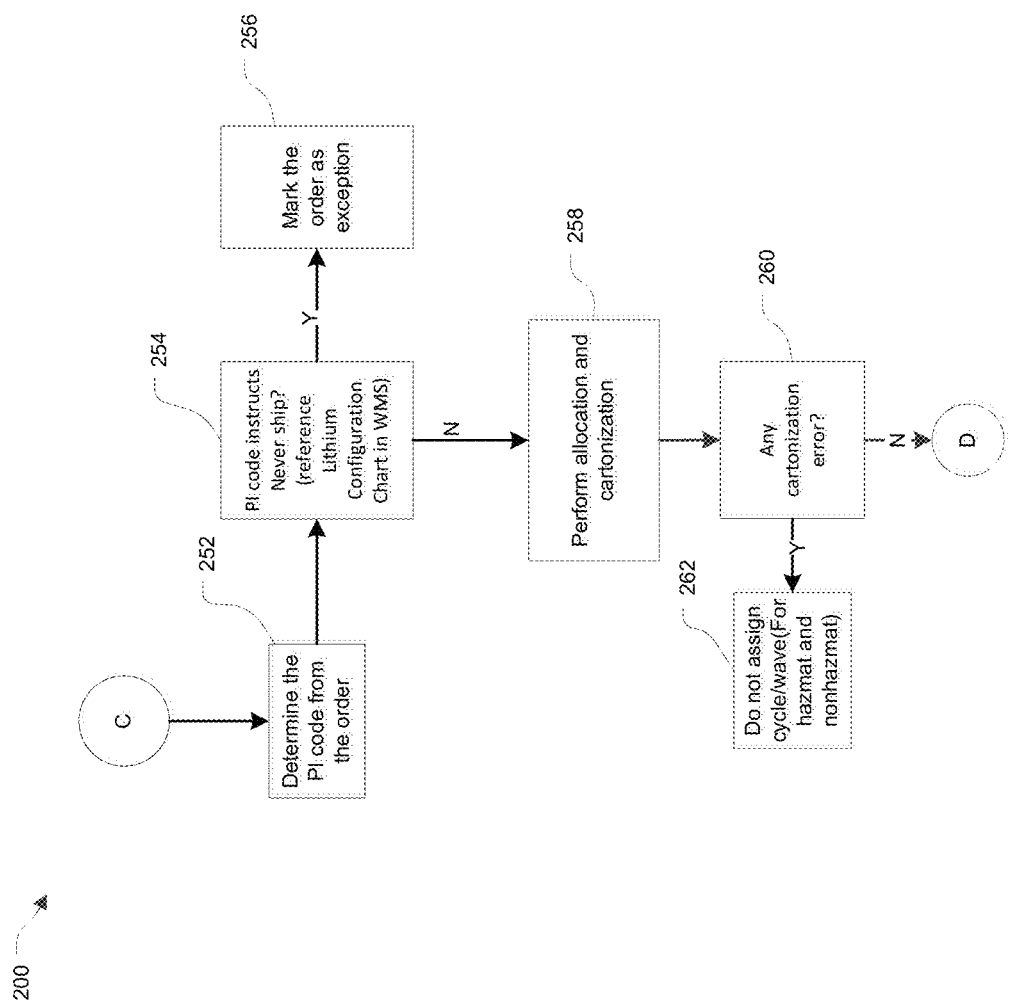
Figure 2D:
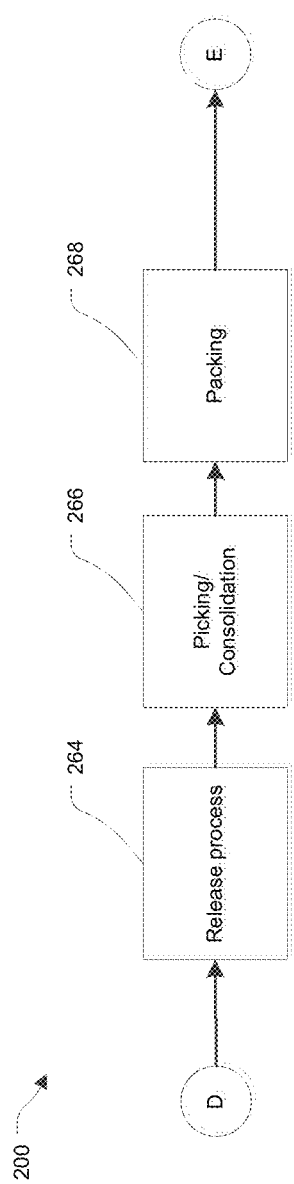
Figure 2E:
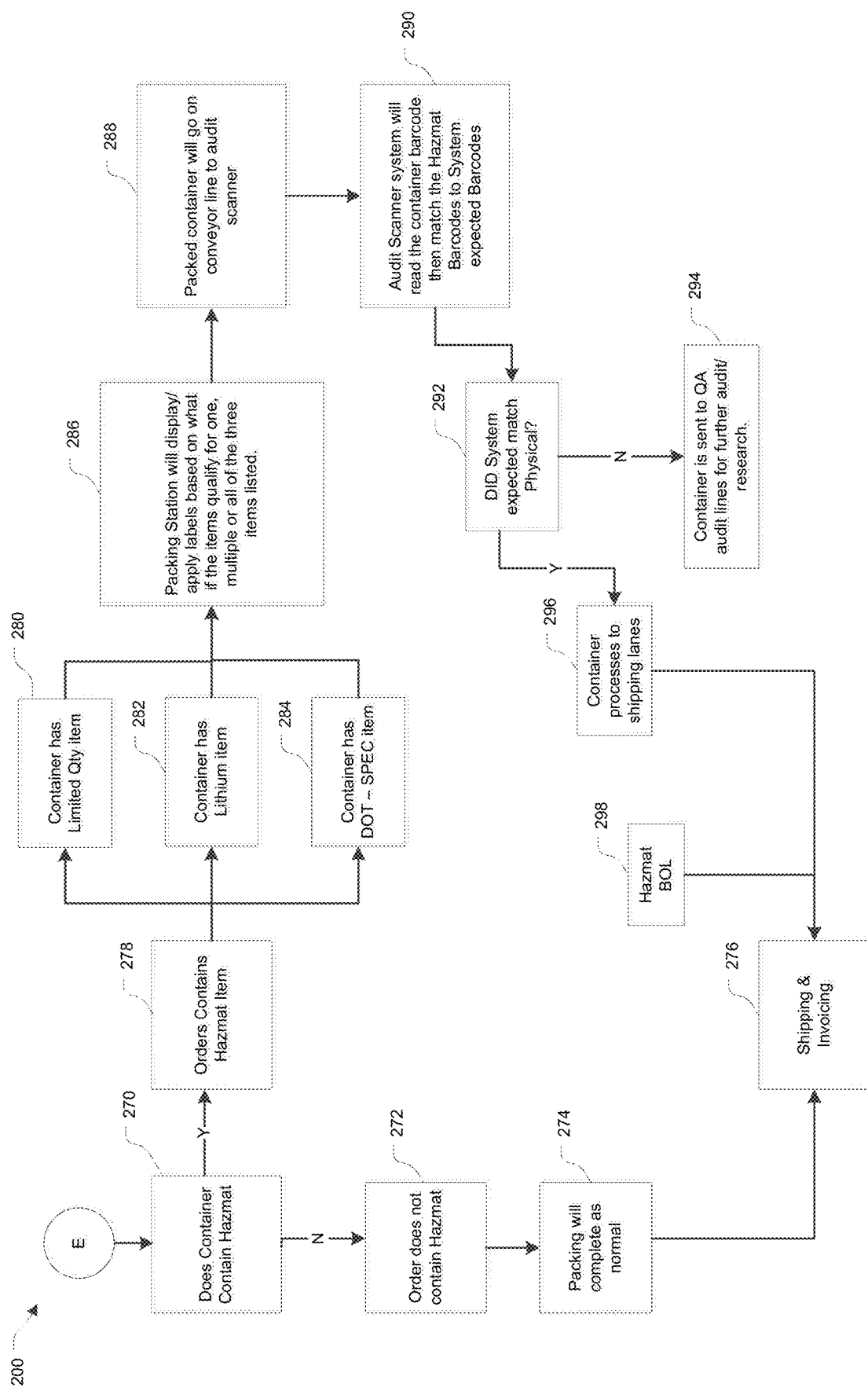
Figure 3:
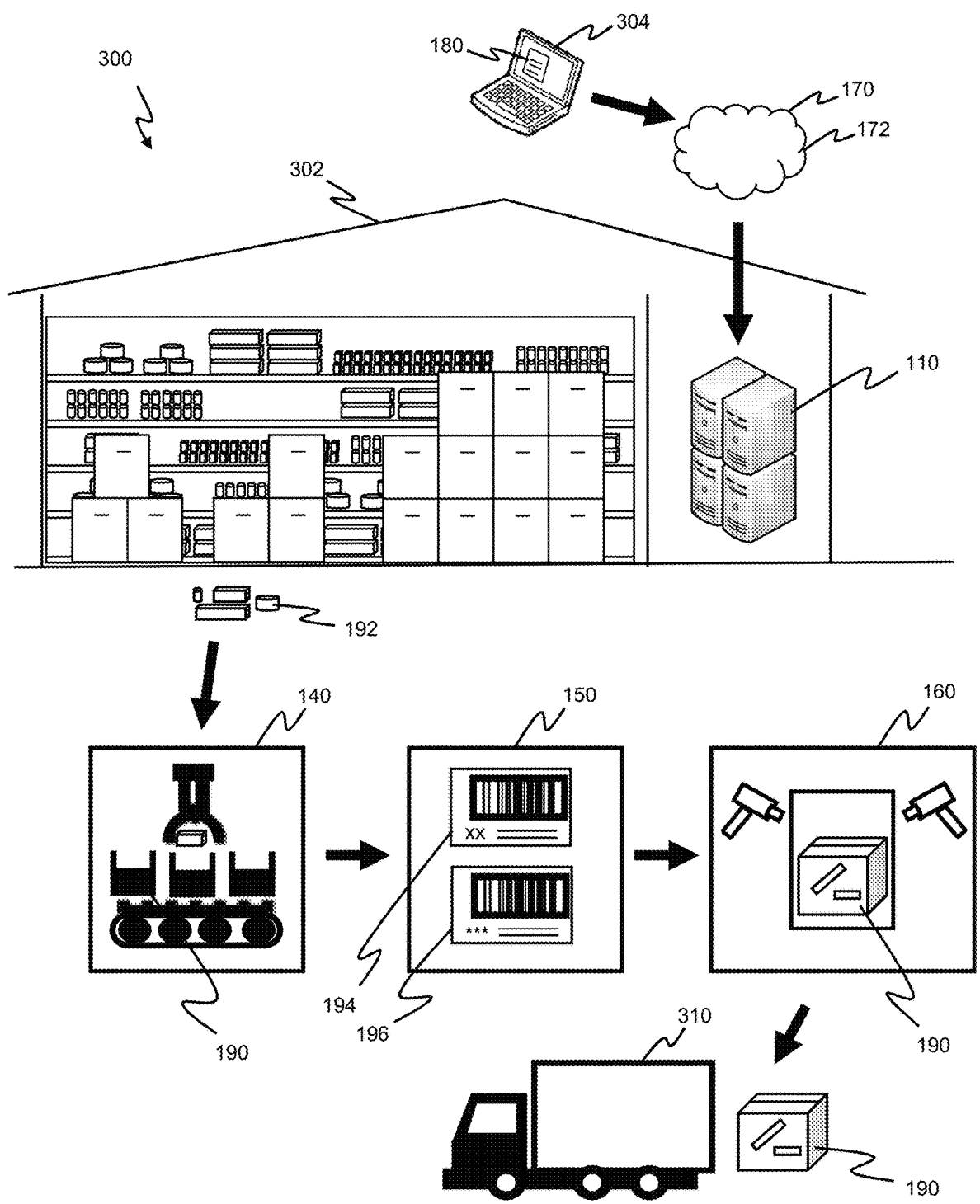
FIG. 3 is a structural flow diagram of an outbound hazmat handling system, according to an embodiment.

FIGS. 1-3 show different diagrams of systems, process flow charts, and structural flow diagrams 100, 200, and 300 generally relating to a common system and methods thereof involving outbound hazmat handling. The diagrams are intended to overlap, supplement, and more fully inform one another.

FIG. 1 shows the outbound hazmat handling system 100 in diagram form. In general, hazmat handling system 100 can be understood to include a server 110 that includes computing hardware and features of at least one processor 120, memory 122, database 124, input/output engine 126, and hazmat handling engine 128. In some embodiments, an allocation and cartonization engine 130 is present on the server 110 as well. In some embodiments, the allocation and cartonization engine 130 is merely communicatively coupled with the server 110 and operates on a separate server or hardware or system. The server 110 can be communicatively coupled to each or some of a conveyance and packing equipment assembly 140, label applicator 150, and scan tunnel 160. The server 110 is generally set forth and described as a local server at a fulfillment center in this disclosure, although other configurations in which the server is remotely located from the fulfillment center are contemplated as well. As shown in FIG. 1, an order management system (OMS) 170 provides customer orders 180 with assigned carriers to the server 110. Additionally, a hazmat item information source 172 supplies an up-to-date hazmat item files 182 of hazmat information related to inventory items at the fulfillment center for download by the server 110.

The processor 120, memory 122, database 124 are each communicatively coupled with one another and operate to obtain customer orders 180 and hazmat item files 182 via the input/output engine 126. The memory 122 is operably coupled to the processor or processors 120 and is configured to store instructions invoked by the processor or processors 120. The input/output engine 126 is configured to receive a customer order 180. Customer orders 180 can originate as online orders for example, which are initially sent to a remote OMS 170 before being received by the input/output engine 126 of server 110. The input/output engine 126 is also configured communicate between the server 110 and the conveyance and packing equipment assembly 140, the labeling applicator 150, and the scan tunnel 160. The database 124 is communicatively coupled via the input/output engine 126 containing downloaded hazmat file information from item file 182 for inventory items.

The hazmat handling engine 128 within the system 100 determines customer orders 180 that necessitate exceptions requiring specialized handling. These exceptions can include: customer orders 180 that contain a hazmat item where the assigned carrier cannot handle the azmat item; customer orders 180 that contain a fully regulated item; customer orders 180 that contain ORM-D/Limited Qty items and a never ship PI code; and customer orders 180 that contain lithium items and a never ship packaging instruction code. The hazmat handling engine 128 marks determined customer orders with exceptions and forwards the remaining orders for allocation and cartonization wherein the forwarded customer orders include any associated shipping codes, PI codes, and hazmat labeling information.

Stated another way, the WMS, and specifically, the hazmat handling engine 128 on the server 110 as part of the overall warehouse management system (WMS), generally determines if a customer order is for a shipment of Lithium Battery/products base on the attributes of: HAZ ID; Transportation mode (can be determined based on ship via associated with the customer order and transportation mode associated with the ship vias); DOT Haz class code; and Dot HAZMAT #/UN Number (if DOT Haz class code is "N/A" and 'Dot HAZMAT #' is UN 3090, UN3091, UN3480 or UN3481 it means the order is for Lithium Battery/product). Similarly, the hazmat handling engine 128 generally determines if a customer order is for an ORM-D/Limited Qty product based on the attributes of: HAZ ID; Transportation mode (can be determined based on ship via associated with the customer order and transportation mode associated with the ship vias); DOT Haz class code; and If the order is deemed an Air shipment based on the transportation code of the order, the WMS will not allow the order to wave as ORM-D/Limited Qty is not allowed to ship via Air.

The allocation and cartonization engine 130 receives forwarded unmarked customer orders from the hazmat handling engine 128, determines packaging of containers 190, and instructs physical acquisition and consolidation of inventory items 192 into at least one packaged container 190 via the conveyance and packing equipment assembly 140. Throughout this disclosure the term "container" is intended to broadly refer to and include all types of shipping cartons, boxes, bins, receptacles, cases and packages. In some embodiments, the allocation and cartonization engine 128 checks for cartonization errors and does not assign a cycle/wave to orders in which cartonization errors are identified. In some embodiments, the allocation and cartonization engine 128 considers lithium requirements for split based on transportation mode for certain orders containing ORM-D/Limited Qty items or lithium items.

The labeling applicator 150 automatically applies one or more hazmat labels 194 to the packaged container 190 containing hazmat items based on compliance labeling criteria. In some embodiments, the compliance labeling criteria is whether the packaged container includes an ORM-D/Limited Qty item, a lithium item, or a Department of Transportation (DOT) SPEC item. In general, the labeling applicator 150 automatically applies one or more labels to the container, including a shipping label 196 and a hazmat label 194 when applicable.

Further included in the system 100 is a scan tunnel 160 that electronically reads the labels 194 and 196 on the packaged container 190. Packaged containers 190, once labeled by the label applicator 150, are sent via the conveyance and packing equipment assembly 140 to the scan tunnel 160. At the scan tunnel 160, shipping labels 196 and any hazmat labels 194 can be read with barcode readers or other types of data recognition scanners, sensors or data detection devices. Once read, the shipping label 196 and any hazmat labels 194 are compared to expected labels determined by the hazmat handling engine 128 for quality control. In some embodiments, the scan tunnel 160 can include a weight scale or other auditing equipment for verification of the contents of packaged containers 190.

FIGS. 2A-E provide a process flow chart 200 of operation of an outbound hazmat handling system 100, that is broken up into a plurality of figures. The process flow chart 200 begins on FIG. 2A at step 202 corresponding to the receipt of customer orders 180. In general, a remote OMS 170 receives customer orders 180 from sources such as online purchases. At 204, the OMS decides the right carrier that delivers packaged containers (referred to as the "ship via" at times throughout the figures and disclosure) for that customer order 180. Next at 206, a local server 110 at a fulfillment location downloads the customer orders 180 from the OMS 170. Concurrently or previously, at 208, an online item feed or publication sub feed providing an item file 182 of hazmat information from a hazmat item information source 172 is provided for download. At 210, the server 110 downloads hazmat item file information. The server 110 is part of a WMS that utilizes an input/output engine 126, hazmat handling engine 128, and allocation and cartonization engine 130, to ensure orders are appropriately and safely packaged and labeled for shipping.

At 212, the hazmat handling engine 128 reviews the if the order's state/zip is shipped only by air, with reference to a state/sip code air only chart database. If only by air, then at 214, consideration of transportation mode '4' and shipping only by air is chosen. If the state/zip does not limit the order to air shipping, at 216, transporation of the mode is assigned to a ship via within the WMS as provided by the OMS 170. Next, at 218, the hazmat handling engine 128 reviews whether the order contains a hazmat item. If no hazmat item is required by the customer order 180, the customer order 180 proceeds to allocation and cartonization at 220. This is made possible by the allocation and cartonization engine 130, which helps determines optimal packaging of containers, and provides instructions for physical acquisition and consolidation of inventory items 192 into at least one packaged container 190 for the conveyance and packing equipment assembly 140. The system checks for cartonization errors at 222 before proceeding to release process 260 if no cartonization errors are found (See FIG. 2D). If cartonization errors are present, the system does not assign to cycle/wave for hazmat and nonhazmat at 224.

If at 218, the customer order 180 is determined to contain a hazmat item, the hazmat handling engine 128 proceeds to review whether the order's ship-via (assigned carrier) can handle the hazmat item at 228. If the customer order contains a hazmat item where the assigned carreir cannot handle the hazmat item, the order is marked with exceptions at 228. If the order's ship-via can be handled, the hazmat handling engine 128 determines if the order contains fully regulated items at 230. Fully regulated items are defined as when the DOT hazardous class equals a defined number or alpha character. If the order contains fully regulated items, the order is marked with exceptions at 232 and logic is used to handle fully regulated. If the order does not contain fully regulated items, the hazmat handling engine 128 determines whether the order contains ORM-D/Limited Qty items at 234. This generally is defined when the DOT hazard class equals ORM-D or LTD. If the order does contain ORM-D/Limited Qty items, then the order proceeds to step 238 (See FIG. 2B). If the order does not contain ORM-D/Limited Qty items, then the order proceeds to step 236 in which the hazmat handling engine 128 determines if the order contains Lithium items. In these cases, the DOT hazardous class is not applicable and the packing instruction code equals 965, 966, 967, 968, 969 or 970. (For example, 965 refers to Lithium Ion Battery loose; 966 refers to Lithium Ion Battery Packed with Equipment, 967 refers to Lithium Ion Battery Contained in Equipment, 968 refers to Lithium Metal loose, 969 refers to Lithium Metal Packed with Equipment, 970 refers to Lithium Metal contained in Equipment). In these cases, the order proceeds to step 252 (See FIG. 2C).

In FIG. 2B a portion of the process relating to orders identified with ORM-D/Limited Qty items is described. At 238, the hazmat handling engine 128 determines if the order contains a PI code. In general, this occurs when the packing instruction field equals the transportation mode number. If a PI code is not present, at 240 cartonization and allocation is performed. If a PI code is present, at 242 the hazmat handling engine 128 checks whether the PI code instructs to never ship. This is determined via the reference lithium configuration chart in WMS. If the PI code instructs to never ship, the order is marked as an exception at 244. If the PI code does not instruct to never ship, allocation and cartonization is performed at 246. This is made possible by the allocation and cartonization engine 130, which helps determine optimal packaging of containers, and provide instructions for physical acquisition and consolidation of inventory items 192 into at least one packaged container 190 for the conveyance and packing equipment assembly 140. Following both steps 240 and 246, cartonization errors are checked for at 248. If cartonization errors are present, cycle/wave is not assigned for hazmat and nonhazmat items at 250. However, if no cartonization errors are detected, the order proceeds to the release process at 264 (See FIG. 2D).

In FIG. 2C a portion of the process relating to orders identified containing lithium items is described. At 252, the hazmat handling engine 128 determines the PI code from the order and determines whether the PI code instructs to never ship at 254. In general this is determined based on the lithium configuration chart in the WMS. If never ship is instructed, at 256 the order is marked as an exception. If the PI code does not contain a never ship code, allocation and cartonization occurs at 258. This is made possible by the allocation and cartonization engine 130, which helps determines optimal packaging of containers, and provide instructions for physical acquisition and consolidation of inventory items 192 into at least one packaged container 190 for the conveyance and packing equipment assembly 140. Next, at 260 cartonization errors are checked for. If present, no cycle/wave is assigned for hazmat and nonhazmat items at 262. If no cartonization errors are detected, the order proceeds to the release process 264 (See FIG. 2D).

In FIG. 2D orders from any of steps 222, 248, or 260 which do not contain cartonization errors are forwarded to a release process 264 to begin undergoing the actual physical tasks of obtaining, packing, labeling, auditing and shipping of orders. The remaining processes make use of the conveyance and packing equipment assembly 140, the label applicator 150, and scan tunnel 160 previously referenced. After release, the order undergoes a picking and consolidation process at 266. In this process, inventory items 192 are physically acquired and consolidated to at least one packaged container 190 by the conveyance and packing equipment assembly 140 in accordance with instructions from the allocation and cartonization engine 130. Next, the packaging process by the conveyance and packaging equipment 140 occurs at 268. Further, the packaging process continues to proceed to step 270 (See FIG. 2E).

In FIG. 2E, orders undergoing packaging from step 268, proceed to determine if the container being packed contains hazmat items at 270. Items that do not contain hazmat at 272 will complete packing as normal at 274 and finally advance to shipping and invoicing at 276. Orders that do contain hazmat items at step 278 will proceed to be packed based on what category or categories the packed container qualifies for. Namely, 280 indicates the container has a limited quantity item, 282 indicates the container has a lithium item, and 284 indicates that the container has a DOT—SPEC item. Next at 286, the packing station will display labels based on which items the container qualifies for. At 288, the packed container goes on the conveyor line to an audit scanner. At 290 the audit scan system reads the container barcode and match the hazmat barcodes to system expected barcodes using the scan tunnel 160. Next, at 292, the system checks whether the system expected barcodes match the physical barcodes. If not, the container is sent to quality assurance audit lanes for further audits/research at 294. If the expected barcodes match the physical ones, the container proceeds to shipping lanes at 296. This proceeds to shipping and invoicing at 276 including inclusion of a hazmat bill of lading (BOL) at 298.

FIG. 3 shows a structural flow diagram 300 for the outbound hazmat handling system 100. The diagram 300 represents the general flow of customer orders 180 through the components of the system and describes associated method steps for handling of hazmat products in a fulfillment center 302.

In general, customer orders 180 are placed via users at remote interfaces 304 online. Customer orders 180 are sent to an OMS 170 where a ship via (carrier) is assigned to the customer order 180. The customer order 180 of inventory items 192 is sent and received via an input/output engine 122 of a local server 110. A feed of an item file 182 for hazmat items is received from a hazmat item information source 172 as well.

The server 110 provides instructions for a conveyance and packing equipment assembly 140, a labeling applicator 150, and a scan tunnel 160. Allocation and cartonization is carried out by determining packaging of containers and controlling physical acquisition and consolidation of inventory items 192 from the unmarked customer orders into at least one packaged container 190 via the conveyance and packing equipment assembly 140. In various embodiments, a robot automatically picks the inventory items 192 and performs the other tasks involved in conveyance, packaging, label application, and scanning. One or more hazmat labels 194 are applied to the packaged container containing hazmat items based on compliance labeling criteria as well as a shipping label 196 using the labeling applicator 150. More specifically, the system will determine the contents of each container using the container labels and will look up hazmat information from the item file 182. The system will affix the appropriate label for the container depending upon the mode of shipment, destination, and hazmat requirements. Once the labels are applied, the scan tunnel 160 scans the shipping label 196 and the one or more hazmat labels 194. The scanned information is compared to expected labels for identification of possible labeling errors. If no errors are determined, the packaged container 190 is shipped via transport 310 as labeled.

Figure 4:
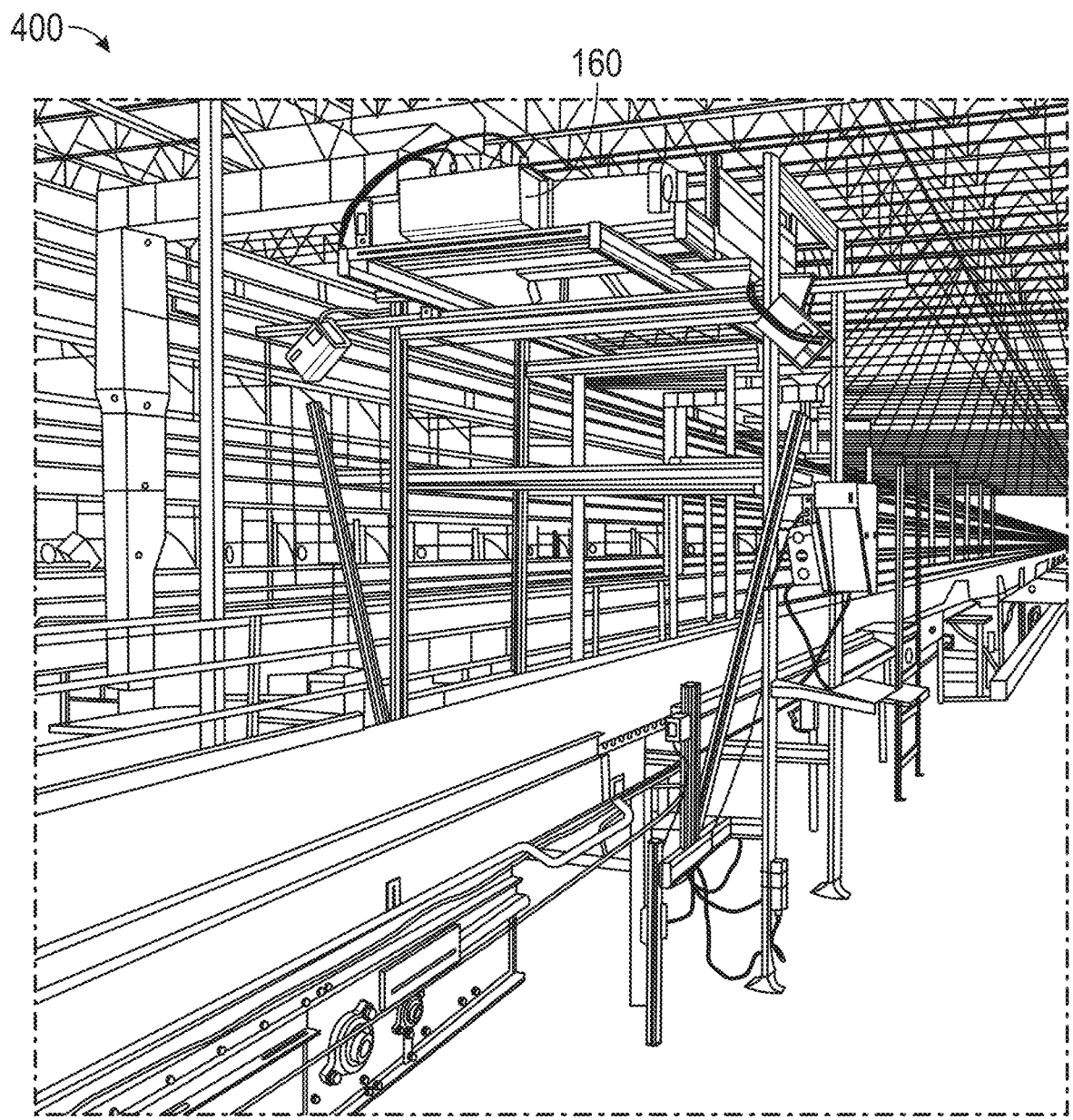
FIG. 4 shows a section of conveyance and packing equipment and a scan tunnel, according to an embodiment.

In FIG. 4, an example 400 is provided showing a section of conveyance equipment and a scan tunnel 160. A scan tunnel 160 can be placed into conveyor lines feeding into high speed lines at fulfillment centers 302. The scan tunnel 160 may be a five-sided box scanner in some embodiments. In some embodiments, the scan tunnel 160 generally confirms that the correct container 190 has the correct hazmat label 194 applied. Exception handling will flag any errant containers 190 in the line and cause the conveyor system to sideline the container 190.

Figure 5:
FIG. 5 is an example of an interface screen showing information associated with a customer order, according to an embodiment.
Figure 6:
FIG. 6 is an example of an interface screen from which hazmat state codes are viewed, according to an embodiment.
Figure 7:
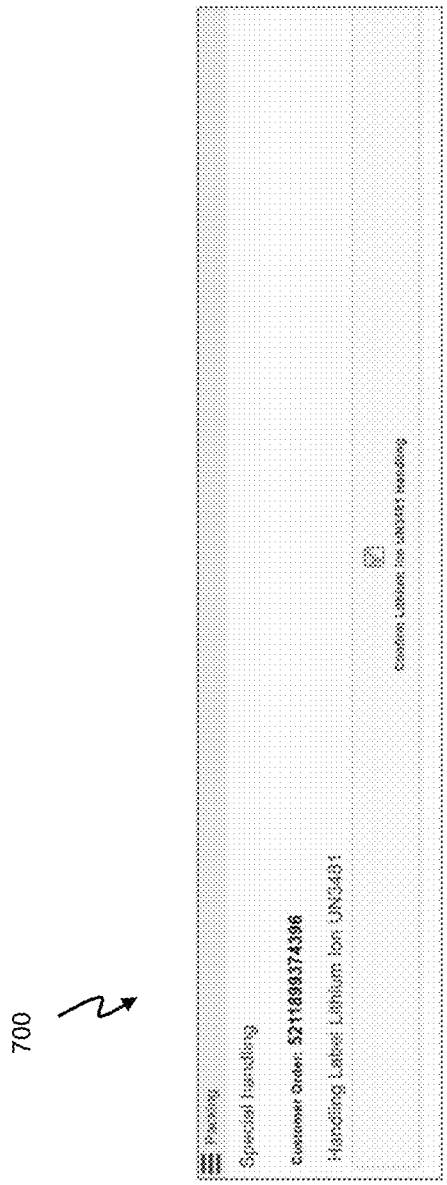
FIG. 7 shows an example of a hazmat label confirmation screen, according to an embodiment.

FIG. 5 shows an example of an interface screen 500 showing information associated with a customer order. Information listed includes the order number, Expected SKUs, Expected shipping label, recommended shipping package, selected shipping package, transportation mode, DOT Haz class codes, and other instructions. Various configurations and user interfaces providing order information are possible. These embodiments and examples should be deemed illustrative and not limiting. Likewise, FIG. 6 broadly shows an example of an interface screen from which hazmat state codes are viewed and FIG. 7 shows an example of a hazmat label confirmation screen.

In embodiments, system 100 and/or its components or systems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various modules or engines, each of which is constructed, programmed, configured, or otherwise adapted, to autonomously carry out a function or set of functions. The term "engine" as used herein is defined as a real-world device, component, or arrangement of components implemented using hardware, such as by an application-specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein.

These embodiments are given only by way of example and are not intended to limit the scope of the claimed subject matter. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed subject matter.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A system for handling of hazmat products in a fulfillment center, comprising:
   a conveyance and packing equipment assembly that facilitates physical acquisition and consolidation of inventory items into a container;
   a labeling applicator that automatically applies one or more labels to the container, including a shipping label and a hazmat label when applicable;
   a scan tunnel that electronically reads the labels on the container;
   a server including computing hardware of:
      at least one processor;
      a memory operably coupled to the at least one processor and configured to store instructions invoked by the at least one processor;

an input/output engine configured to receive a customer order requesting one or more inventory items and communicate between the server and the conveyance and packing equipment assembly, the labeling applicator, and the scan tunnel;

a database communicatively coupled via the input/output engine containing downloaded hazmat file information for the inventory items;

a hazmat handling engine that:
(a) determines customer orders with exceptions requiring specialized handling by determining whether any of the one or more inventory items requested in the customer order is indicated as a hazmat item in the hazmat file information by processing at least one of a hazmat identifier (HAZ ID), transportation mode, Department of Transportation hazmat class code (DOT HAZ class code), or Department of Transportation hazmat number (Dot HAZMAT), the exceptions including: customer orders that contain a hazmat item where an assigned carrier cannot handle the hazmat item; customer orders that contain a fully regulated item; customer orders that contain ORM-D/Limited Qty items and a never ship packaging instruction (PI) code; and customer orders that contain lithium items and a never ship packaging instruction code;
(b) marks the determined customer orders with exceptions; and
(c) forwards the customer orders that are not marked with a never ship PI code for allocation and cartonization; and an allocation and cartonization engine that receives the forwarded customer orders from the hazmat handling engine, and instructs physical acquisition and consolidation of inventory items into at least one packaged container via the conveyance and packing equipment assembly;

wherein the labeling applicator automatically applies one or more hazmat labels to the at least one packaged container when it is containing hazmat items based on compliance labeling criteria, and wherein the at least one packaged container, once labeled, is sent via the conveyance and packing equipment assembly to the scan tunnel where the shipping label and any hazmat labels are read with barcode readers.

2. The system of claim 1, wherein the compliance labeling criteria is whether the at least one packaged container includes a ORM-D/Limited Qty item, a lithium item, or a Department of Transportation (DOT) SPEC item.

3. The system of claim 1, wherein the shipping label and any hazmat labels that are read are compared to expected labels determined by the hazmat handling engine for quality control.

4. The system of claim 1, wherein the scan tunnel further includes a weight scale for verification of container contents.

5. The system of claim 1, wherein the at least one packaged container is a box or a carton.

6. The system of claim 1, wherein the allocation and cartonization engine checks for cartonization errors and does not assign a cycle/wave to orders in which cartonization errors are identified.

7. The system of claim 1, wherein the allocation and cartonization engine considers lithium requirements for split based on transportation mode for certain orders containing ORM-D/Limited Qty items or lithium items.

8. The system of claim 1, wherein the allocation and cartonization engine is located on the server.

9. A method for handling of hazmat products in a fulfillment center, comprising:

receiving customer orders of inventory items via an input/output engine of a local server, wherein the server provides instructions for a conveyance and packing equipment assembly, a labeling applicator, and a scan tunnel, wherein the server includes: at least one processor; a memory operably coupled to the at least one processor and configured to store instructions invoked by the at least one processor; the input/output engine; a database communicatively coupled via the input/output engine; and a hazmat handling engine;

determining via the hazmat handling engine whether customer orders require specialized handling exceptions based on whether they contain: a hazmat item where an assigned carrier cannot handle the hazmat item; a fully regulated item; ORM-D/Limited Qty items and a never ship packaging instruction (PI) code; or lithium items and a never ship packaging instruction code by processing at least one of a hazmat identifier (HAZ ID), transportation mode, Department of Transportation hazmat class code (DOT HAZ class code), or Department of Transportation hazmat number (Dot HAZMAT);

marking the customer orders that require specialized handling exceptions;

forwarding the customer orders that are not marked with a never ship PI code for allocation and cartonization;

carrying out allocation and cartonization by determining packaging of containers and controlling physical acquisition and consolidation of inventory items from the forwarded customer orders into at least one packaged container via the conveyance and packing equipment assembly;

applying one or more hazmat labels to the at least one packaged container when it is containing hazmat items based on compliance labeling criteria and applying a shipping label using the labeling applicator;

scanning the shipping label and the one or more hazmat labels with the scan tunnel and comparing scanned information to expected labels for identification of possible labeling errors; and providing the at least one packaged container for shipping as labeled.

10. The method of claim 9, wherein carrying out allocation and cartonization includes identifying unmarked customer orders having cartonization errors and removing the unmarked customer orders from further cycling.

11. The method of claim 9, wherein the compliance labeling criteria are whether the at least one packaged container includes a ORM-D/Limited Qty item, a lithium item, or a Department of Transportation (DOT) SPEC item.

12. The method of claim 9, wherein the at least one packaged container is a box or a carton.

13. The method of claim 9, wherein carrying out allocation and cartonization by determining packaging of containers and controlling physical acquisition and consolidation of inventory items considers lithium requirements for split based on transportation mode for certain orders containing ORM-D/Limited Qty items or lithium items.

14. A system for handling of hazmat products in a fulfillment center, comprising:

means for receiving customer orders of inventory items;

means for determining via a hazmat handling engine whether customer orders require specialized handling exceptions based on whether they contain: a hazmat item where an assigned carrier cannot handle the hazmat item; a fully regulated item; ORM-D/Limited Qty items and a never ship packaging instruction (PI) code; or lithium items and a never ship packaging instruction code by processing at least one of a hazmat identifer (HAZ ID), transportation mode, Department of Transportation hazmat class code (DOT HAZ class code), or Department of Transportation hazmat number (Dot HAZMAT);

means for marking the customer orders that require specialized handling exceptions;

means for forwarding the customer orders that are not marked with a never ship PI code for allocation and cartonization;

means for carrying out allocation and cartonization by controlling physical acquisition and consolidation of inventory items from the forwarded customer orders into at least one packaged container via the conveyance and packing equipment assembly;

means for applying one or more hazmat labels to the at least one packaged container when it is containing hazmat items based on compliance labeling criteria and applying a shipping label using the labeling applicator, wherein the at least one packaged container, once labeled, is sent via the conveyance and packing equipment assembly to the scan tunnel where the shipping label and any hazmat labels are read with barcode readers;

means for scanning the shipping label and the one or more hazmat labels with the scan tunnel and comparing scanned information to expected labels for identification of possible labeling errors; and means for providing the at least one packaged container for shipping as labeled.

* * * * *